March 25, 1924. 1,487,775

A. WITTMAN

FLYING MACHINE

Filed Oct. 27, 1922  3 Sheets-Sheet 3

A. Wittman INVENTOR

BY Victor J. Evans ATTORNEY

WITNESS:

Patented Mar. 25, 1924.

1,487,775

UNITED STATES PATENT OFFICE.

ADOLPH WITTMAN, OF ST. LOUIS, MISSOURI.

FLYING MACHINE.

Application filed October 27, 1922. Serial No. 597,202.

*To all whom it may concern:*

Be it known that I, ADOLPH WITTMAN, a citizen of the United States, residing at St. Louis, in the county of St. Louis City and State of Missouri, have invented new and useful Improvements in Flying Machines, of which the following is a specification.

This invention relates to improvements in flying machines and has for an object the provision of a machine which includes a novel construction and arrangement of propellers, capable of driving the machine forward in the ordinary manner, or of lifting the said machine vertically as in machines of the helicopter type.

Another object of the invention is the provision of a machine wherein the parts are arranged to provide a simple and powerful machine which will occupy a relatively small amount of space, whereby, due to the arrangement and operation of the propellers, the machine may ascend from a landing upon a space of a relatively small size.

With the above and other objects in view, the invention further includes the following novel features and details of construction, to be hereinafter more fully described, illustrated in the accompanying drawings and pointed out in the appended claim.

In the drawings:—

Figure 1:
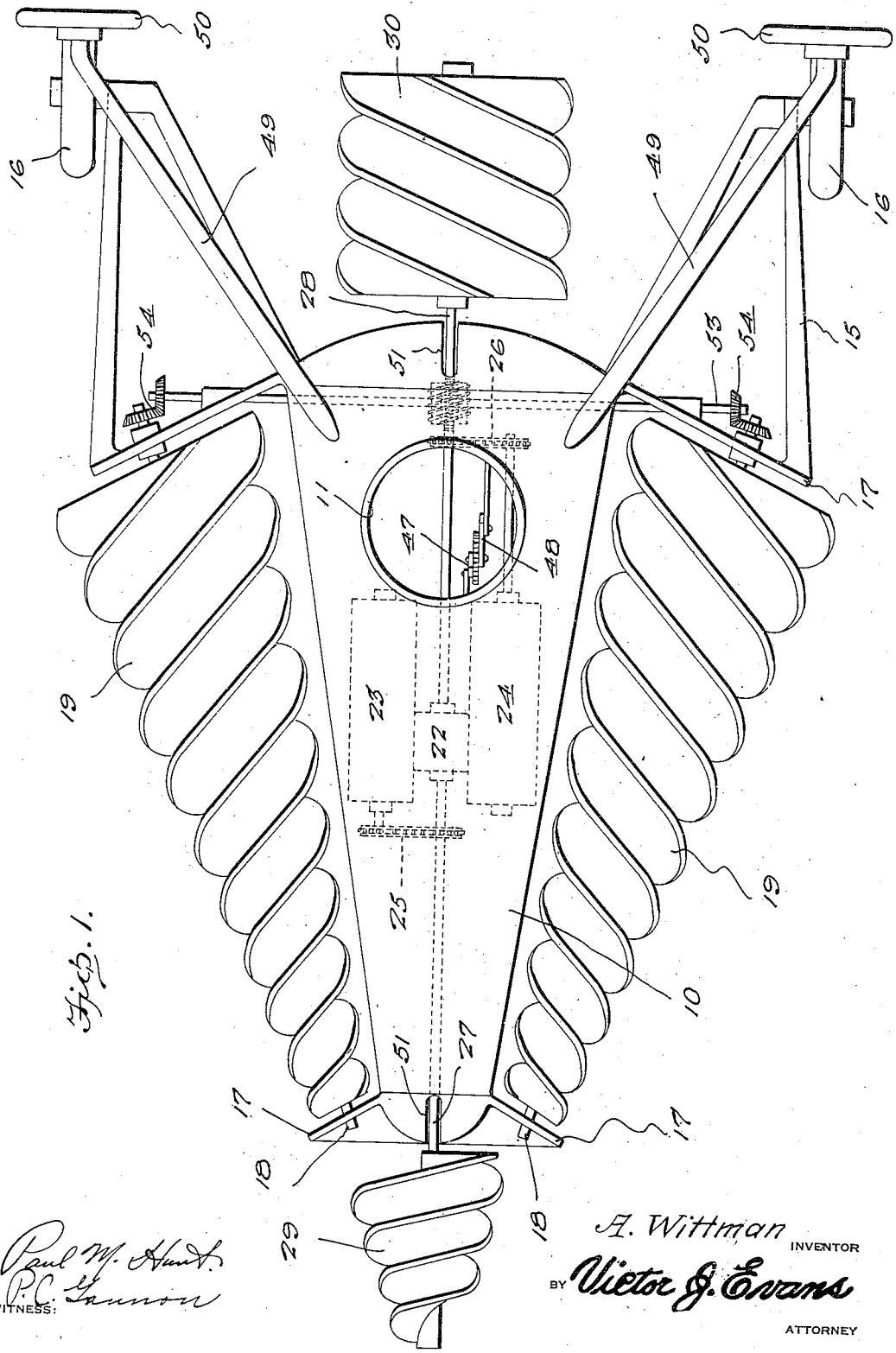
Figure 1 is a top plan view of a flying machine constructed in accordance with the invention.

Referring in detail to the drawings, wherein like characters of reference denote corresponding parts, the flying machine is shown as comprising a fuselage or body 10 which is substantially conical in shape and which is provided with a cock pit opening 11 and supporting or landing gear 12. The latter includes a frame from which extends a centrally located forward leg 13 which carries a wheel 14 and outwardly and rearwardly extending legs 15 which carry wheels 16, so that when the machine is supported upon this wheel, the body or fuselage will be in a horizontal position.

Mounted in suitable bearing arms 17 which extend outwardly upon opposite sides of the body 10 at the front and rear ends thereof is a shaft 18, upon which there is mounted a propeller 19, the shafts of these propellers extending forwardly and inwardly toward the center of the machine from the rear to the front end. The propellers 19 are of the screw or spiral type and are substantially cone-shaped as shown in Figure 1 of the drawings.

Extending longitudinally of the body or fuselage 10 within the same is a main drive shaft which includes a forward section 20 and a rear section 21, the said sections being connected by suitable gearing arranged within a casing or housing 22, whereby when the main shaft is rotated, the section 20 will operate in a reverse direction from the section 21. The main drive shaft is operated from a suitable motor through gearing of any character and it is preferred to employ two motors 23 and 24, the former being geared to the forward section 20 of the main drive shaft as shown at 25, while the motor 24 is geared to the section 21 of the main drive shaft by gearing 26. The motors 23 and 24 may simultaneously operate to drive the main drive shaft, or if desired, suitable clutches may be provided wherein either of these motors may be disengaged so that the shaft may be operated from a single motor.

Coupled to the sections 20 and 21 of the main drive shaft are propeller shafts 27 and 28, the former extending forwardly and carrying a substantially cone-shaped spiral or screw propeller 29, while the shaft 28 extends rearwardly and carries a spiral or screw propeller 30, the spirals of which are arranged in a direction reverse to the direction of the spirals of the propeller 29, the purpose being to have the propeller 29 act as a pulling propeller, while the propeller 30 acts as a driving or thrust propeller.

Figure 4:
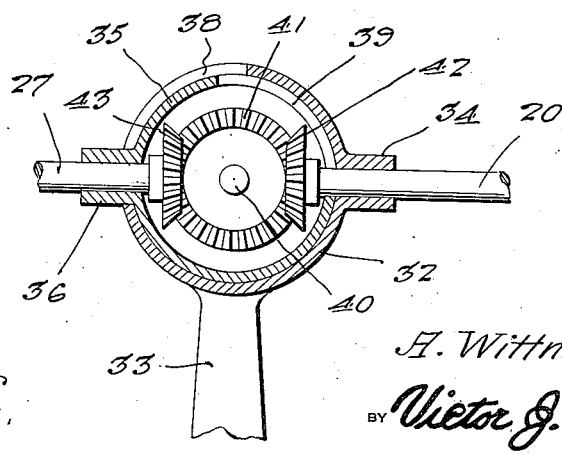
Figure 4 is a fragmentary sectional view illustrating the adjustable connection between the main shaft and the individual shafts of the forward and rear propellers.

The shafts 27 and 28 are coupled to the sections 20 and 21 of the main drive shaft by similar coupling mechanism designated generally at 31. This coupling mechanism is illustrated in detail in Figure 4 of the drawings and comprises a substantially spherical housing 32 which is mounted on a standard 33. The housing 32 contains a stationary bearing 34 for the section of the main drive shaft, for example, the section 20. Operating within the housing 32 is a housing 35, which contains a bearing 36 for the propeller shaft and the housing 32 is provided with a slot 38 while the housing 35 is provided with a slot 39 to accommodate the shafts 20 and 27 respectively. Mounted within the housing 35 is a shaft 40, which, in addition to acting as a pivotal connection between the housings 32 and 35, has mounted thereon a gear 41. This gear is engaged by pinions 42 and 43 which are carried respectively by the shafts 20 and 27, so that rotation of the main drive shaft will impart rotation to the propeller shafts. The shaft 40 of each of the coupling devices 31 has secured thereon an arm 44, while pivotally connected to these arms are rods 45 and 46, the said rods being in turn connected to controlling levers 47 and 48 respectively, the said levers being located within the cock pit of the fuselage or body.

Extending from the upper rear end of the fuselage or body 10 are rearwardly and outwardly disposed legs 49 which carry cushion wheels or disks 50 at their outer ends, the said wheels or disks occupying the same relative positions with respect to the axial center of the fuselage or body as the wheel 16.

Figure 2:
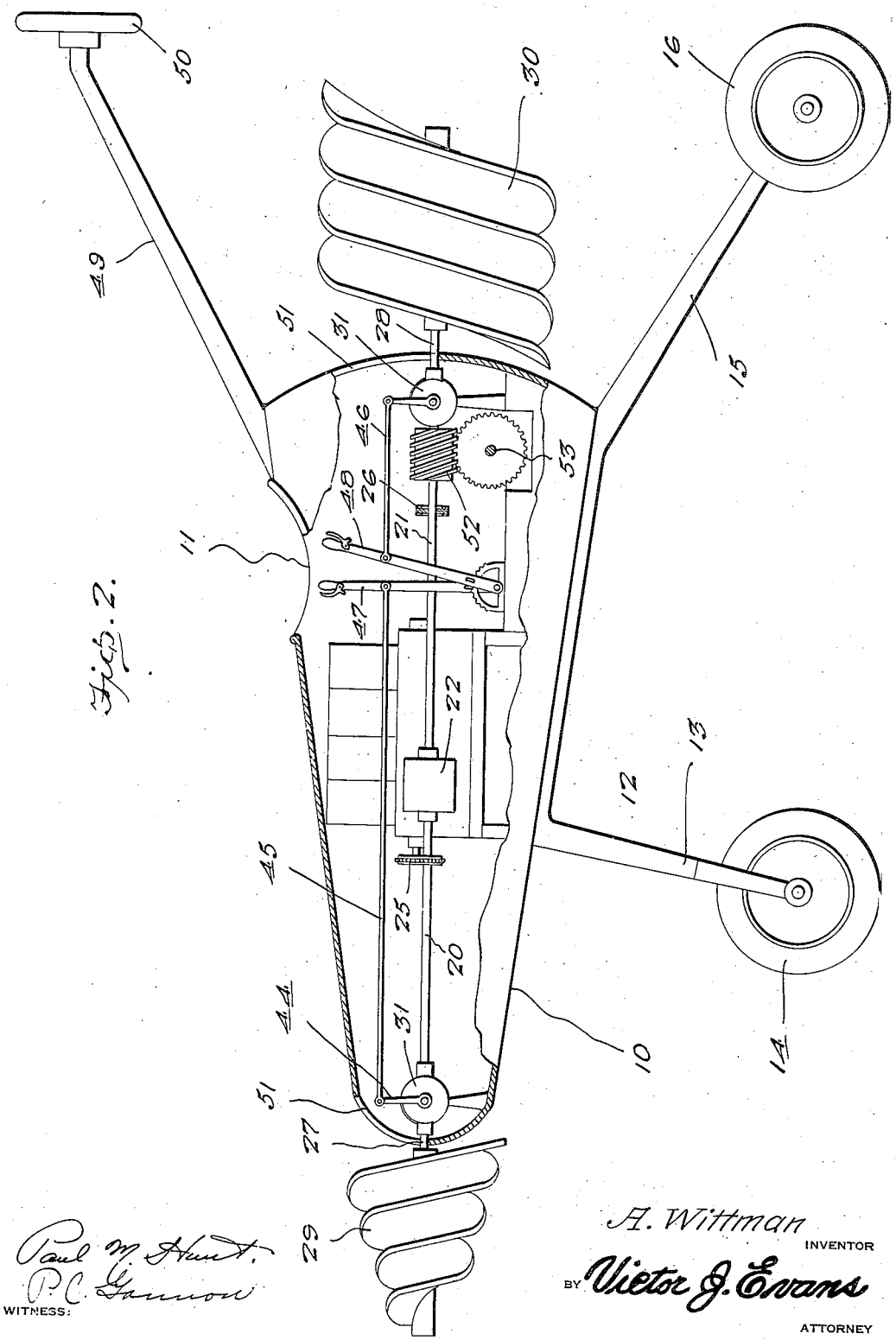
Figure 2 is a side elevation of the same showing the body or fuselage broken away.
Figure 3:
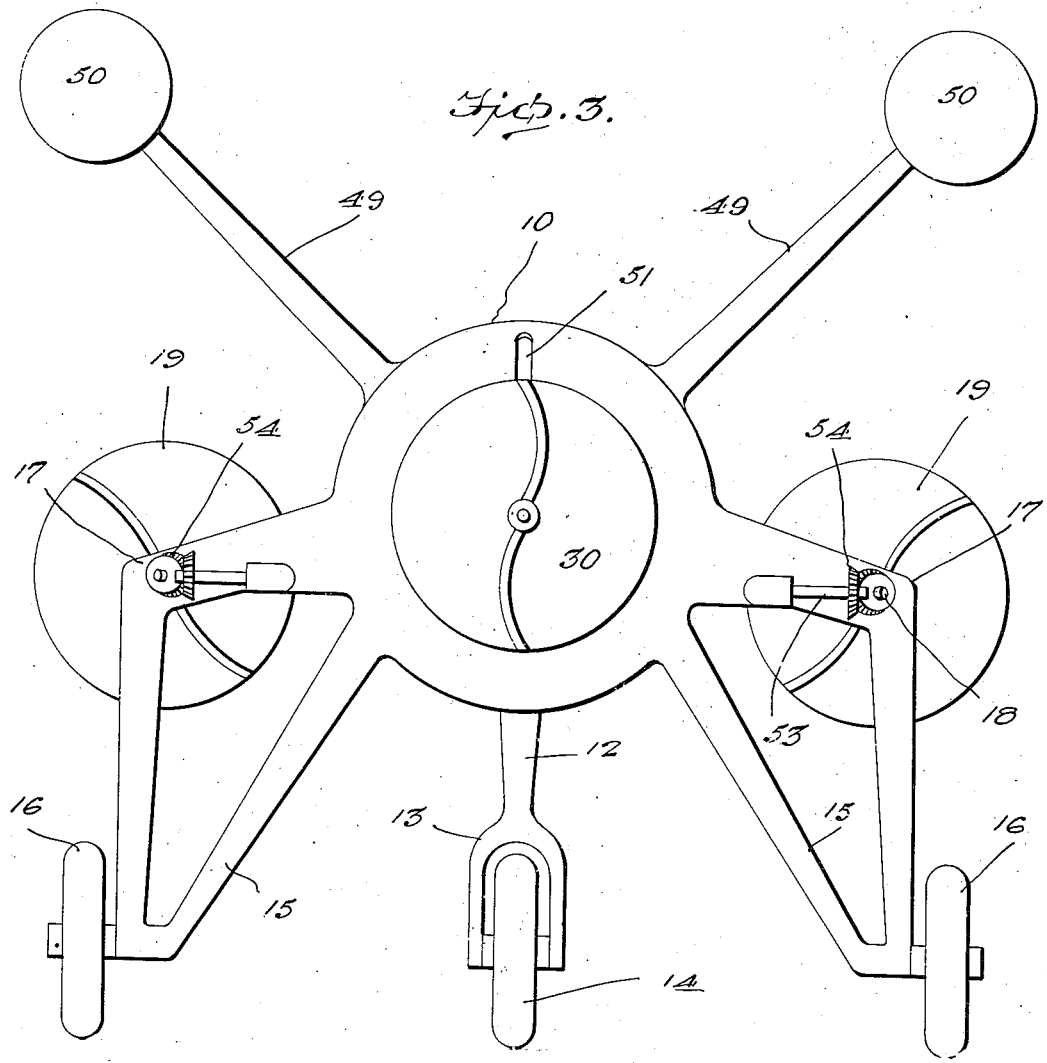
Figure 3 is a rear end view.

As shown in Figures 2 and 3 of the drawings, the machine may be supported in a horizontal position upon the wheels 14 and 16 and may be started and rise from the ground after the manner of the usual airplane, the lifting action being obtained by adjusting the propellers 29 and 30 through the adjustable coupling devices 31 previously described so that the positions of the propellers may be changed with respect to the longitudinal center of the machine, slots 51 being provided in the ends of the body for this purpose. The machine may also rise vertically as in a machine of the helicopter type and for this purpose, the forward propeller 29 may be operated to exert an upward pull upon the forward end of the machine, whereupon the machine will pivot upon the wheel 16 so that the body will assume a vertical position resting upon the wheels 16 and 50. The propellers may then operate to force the machine upward.

The propellers 19 are driven from the section 21 of the main drive shaft and for this purpose the said section is connected by means of gearing 52 with a shaft 53, the latter being mounted in suitable bearings and extending transversely across the rear of the body 10. The opposite ends of the shaft 53 are connected by means of gearing 54 with the shafts 18 of the propellers 19.

The invention is susceptible of various changes in its form, proportions and minor details of construction and the right is herein reserved to make such changes as properly fall within the scope of the appended claim.

Having described the invention what is claimed is:—

A flying machine comprising an elongated fuselage tapered from its rear to its front end, forwardly tapered screw propellers mounted upon diametrically opposite sides of the fuselage, a forwardly tapered screw propeller extending centrally from the front of the fuselage between the side propellers, a screw propeller extending rearwardly from the fuselage in alignment with the front propeller, means whereby the propellers may be operated and horizontally and vertically arranged land gear for supporting the fuselage in either horizontal or vertical position.

In testimony whereof I affix my signature.

ADOLPH WITTMAN.